US010723448B2

(12) United States Patent
Paulson et al.

(10) Patent No.: US 10,723,448 B2
(45) Date of Patent: Jul. 28, 2020

(54) ROTOR BLADE WEIGHT SYSTEM

(71) Applicant: Bell Helicopter Textron, Inc., Fort Worth, TX (US)

(72) Inventors: Jared Mark Paulson, Fort Worth, TX (US); Bryan Marshall, Mansfield, TX (US); Paul Sherrill, Grapevine, TX (US); Bryan Judd, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 167 days.

(21) Appl. No.: 15/350,338

(22) Filed: Nov. 14, 2016

(65) Prior Publication Data

US 2018/0135728 A1 May 17, 2018

(51) Int. Cl.

| | |
|---|---|
| *B64C 27/00* | (2006.01) |
| *F16F 15/32* | (2006.01) |
| *B64C 11/20* | (2006.01) |
| *B64C 27/473* | (2006.01) |
| *B64C 29/00* | (2006.01) |
| *B64C 27/04* | (2006.01) |
| *F16F 15/34* | (2006.01) |
| *B64C 11/00* | (2006.01) |

(52) U.S. Cl.
CPC .......... *B64C 27/008* (2013.01); *B64C 11/008* (2013.01); *B64C 11/20* (2013.01); *B64C 27/04* (2013.01); *B64C 27/473* (2013.01); *B64C 29/0033* (2013.01); *F16F 15/32* (2013.01); *F16F 15/34* (2013.01)

(58) Field of Classification Search
CPC .... F16F 15/32; F16F 15/34; F16F 2230/0005; F16F 2230/0011; F16F 2230/32; B64C 11/008; B64C 11/20; B64C 27/04; B64C 27/008; B64C 27/473; B64C 29/0033; B64C 11/24; B64C 27/51; B64C 2027/005
USPC .................................................. 416/144, 145
See application file for complete search history.

(56) References Cited

U.S. PATENT DOCUMENTS

| | | | | | |
|---|---|---|---|---|---|
| 2,436,263 | A | * | 2/1948 | Moline .................. | B61H 13/36 |
| | | | | | 188/223.6 |
| 2,620,884 | A | * | 12/1952 | Gluhareff .............. | B64C 27/008 |
| | | | | | 416/144 |
| 2,955,662 | A | * | 10/1960 | Bonnett ................ | B64C 27/008 |
| | | | | | 416/144 |

(Continued)

FOREIGN PATENT DOCUMENTS

| | | | | |
|---|---|---|---|---|
| DE | 4036708 | A1 * | 5/1992 | ........... B64C 27/008 |
| FR | 1547785 | A | 11/1968 | |
| FR | 2781196 | A1 | 1/2000 | |

OTHER PUBLICATIONS

Exam Report in related European Patent Application No. 17154716.9 dated Apr. 5, 2018, 5 pages.

(Continued)

*Primary Examiner* — Christopher Verdier
*Assistant Examiner* — Juan G Flores
(74) *Attorney, Agent, or Firm* — Lightfoot & Alford PLLC

(57) ABSTRACT

A weight system for a rotor blade includes a weight box open in an outboard direction, a weight guide rod connected to the weight box, the weight guide rod extending in a spanwise direction through an interior of the weight box, and a span balance weight disposed within the weight box, the span balance weight being captured between the weight guide rod and the weight box.

11 Claims, 22 Drawing Sheets

(56) References Cited

U.S. PATENT DOCUMENTS

| | | | | |
|---|---|---|---|---|
| 3,103,977 A * | 9/1963 | Negroni | ............... | B64C 27/46 |
| | | | | 416/144 |
| 4,150,920 A * | 4/1979 | Belko | ................ | B64C 27/473 |
| | | | | 416/145 |
| 5,273,398 A * | 12/1993 | Reinfelder | ............ | B64C 27/008 |
| | | | | 416/144 |
| 6,139,271 A * | 10/2000 | Chadwick | ............ | B64C 27/008 |
| | | | | 416/134 A |
| 6,196,066 B1 * | 3/2001 | Barbier | ............. | B64C 27/008 |
| | | | | 73/456 |
| 2009/0226325 A1 * | 9/2009 | Gupta | .................. | B64C 11/20 |
| | | | | 416/226 |
| 2010/0189561 A1 * | 7/2010 | Vettese | ................ | F03D 1/065 |
| | | | | 416/144 |

OTHER PUBLICATIONS

European Search Report in related European Patent Application No. 17154716.9; dated Aug. 8, 2017; 4 pages.
Exam Report in related European Patent Application No. 17154716.9; dated Sep. 4, 2017; 6 pages.
Exam Report in related European Patent Application No. 17154716.9 dated Nov. 26, 2018, 5 pages.
Exam Report in related European Patent Application No. 17154716.9 dated May 22, 2019, 4 pages.

* cited by examiner

ROTOR BLADE WEIGHT SYSTEM

BACKGROUND

Many systems for balancing rotorcraft blades exist that utilize weights. However, existing systems for balancing rotorcraft blades require securing the systems to the blade utilizing components that extend into and/or through outer skins or other outwardly located layers of the blade. In some cases, holes are formed in the outer skins to accommodate fasteners that extend through the outer skins. In other cases, access doors to the systems for balancing the blade similarly require breaks and/or discontinuities in the outer skins and/or outer mold line of the blade. The breaks and/or discontinuities in the outer skins and/or outer mold line of the blade generally tend to promote premature erosion and/or cracking of the material due to stress concentrations and/or increases in collisions with particulate matter such as sand. Further, many systems for balancing rotorcraft blades are not easily accessible after the blade is fully constructed, sometimes requiring overly destructive disassembly to access and/or adjust the systems for balancing the blade.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
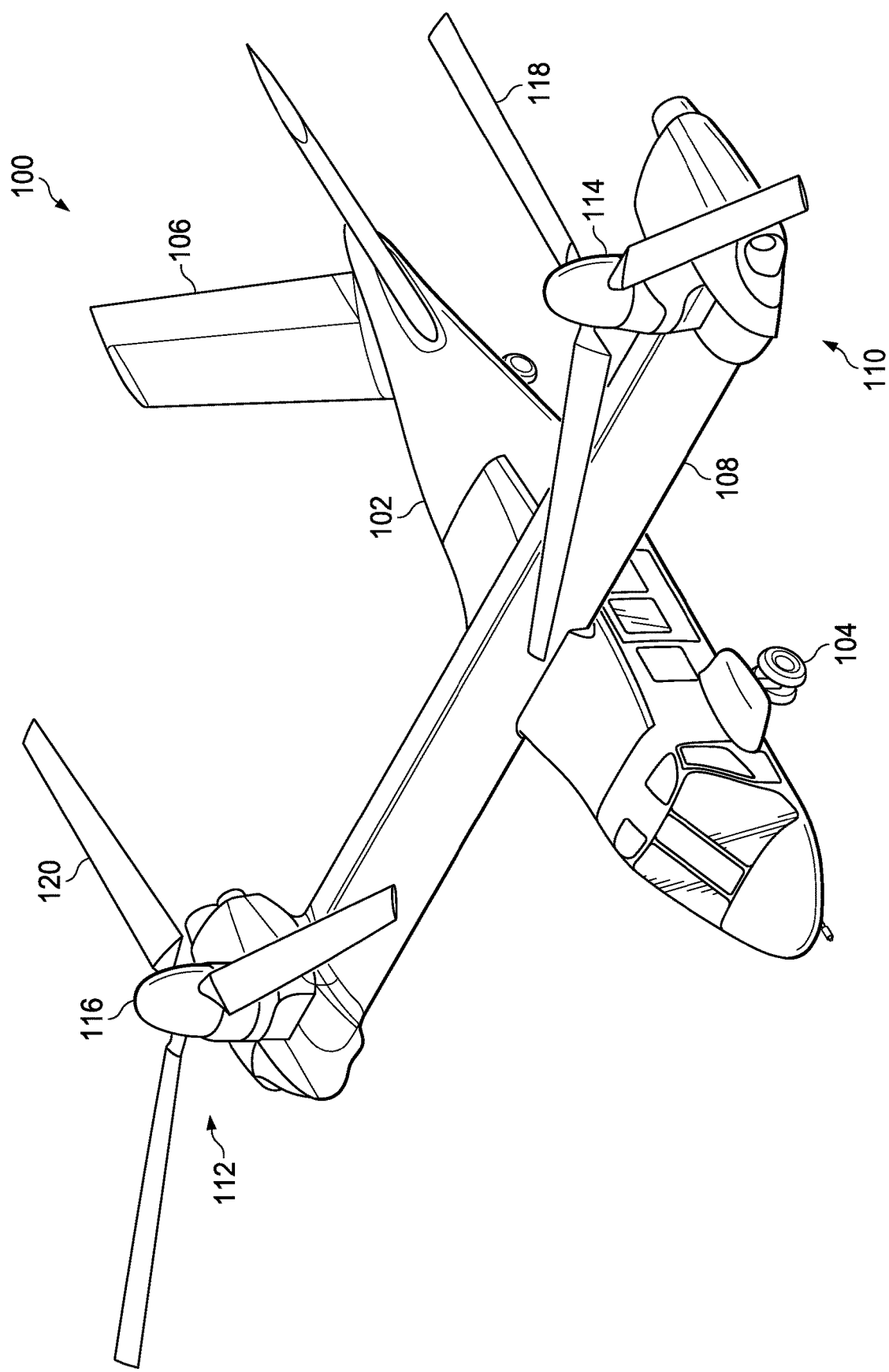
FIG. 1 is an oblique view of an aircraft according to an embodiment of this disclosure showing the aircraft in a helicopter mode of operation, the aircraft comprising a weight system according to an embodiment of this disclosure.
Figure 2:
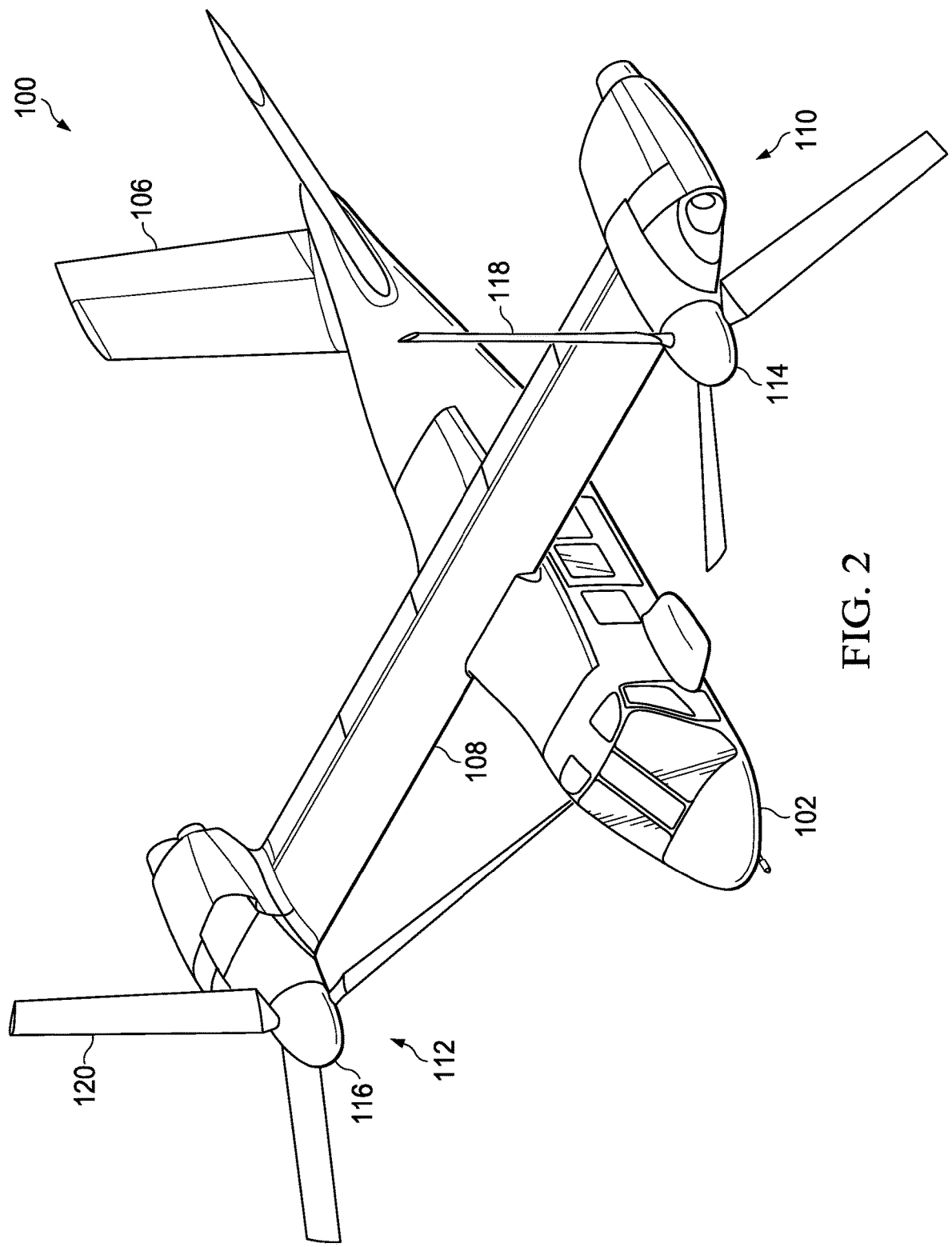
FIG. 2 is an oblique view of the aircraft of FIG. 1 showing the aircraft in an airplane mode of operation.

Referring to FIGS. 1 and 2 in the drawings, a tiltrotor aircraft 100 is illustrated. Tiltrotor aircraft 100 can include a fuselage 102, a landing gear 104, a tail member 106, a wing 108, a propulsion system 110, and a propulsion system 112. Each propulsion system 110 and 112 includes a fixed engine and a rotatable proprotor 114 and 116, respectively. Each rotatable proprotor 114 and 116 have a plurality of rotor blades 118 and 120, respectively, associated therewith. The position of proprotors 114 and 116, as well as the pitch of rotor blades 118 and 120, can be selectively controlled in order to selectively control direction, thrust, and lift of tiltrotor aircraft 100.

FIG. 1 illustrates tiltrotor aircraft 100 in a grounded helicopter mode, in which proprotors 114 and 116 are positioned substantially vertical to provide a lifting thrust. FIG. 2 illustrates tiltrotor aircraft 100 in an airplane mode, in which proprotors 114 and 116 are positioned substantially horizontal to provide a forward thrust in which a lifting force is supplied by wing 108. It should be appreciated that tiltrotor aircraft 100 can be operated such that proprotors 114 and 116 are selectively positioned between airplane mode and helicopter mode, which can be referred to as a conversion mode.

Figure 3:
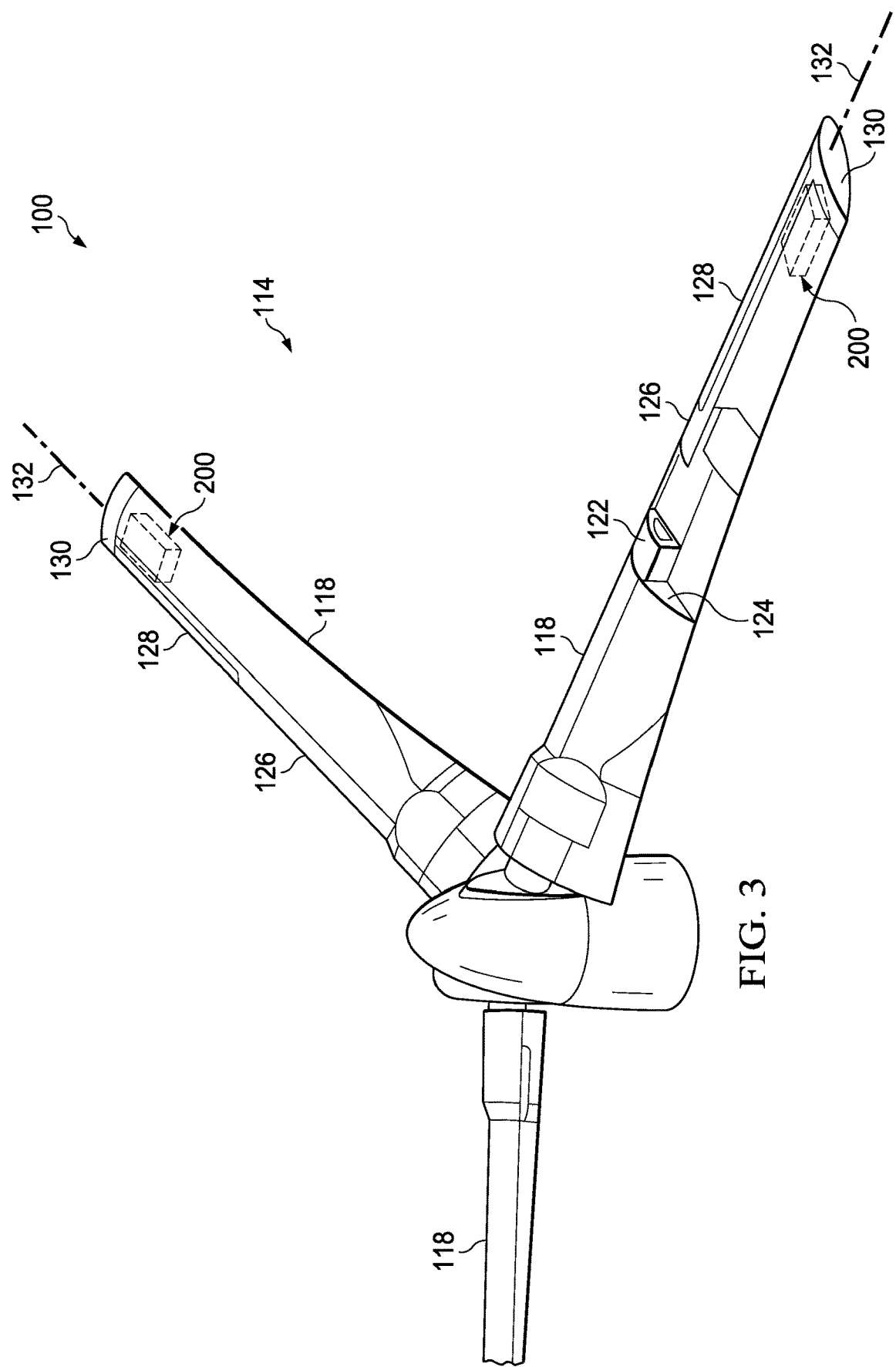
FIG. 3 is a partial oblique view of the aircraft of FIG. 1 showing a proprotor of the aircraft of FIG. 1.

FIG. 3 illustrates proprotor 114 and shows that rotor blades 118 comprise composite construction. More specifically, the rotor blades 118 generally comprise a spar 122 that serves as a primary structural component, a lightweight composite core 124, an outer skin 126, an erosion shield 128, and an end cap 130. In other embodiments, the rotor blades 118 can further comprise heater mats, foam fillings, and/or other features. The rotor blades 118 further comprise a pitch change axis 132 about which the rotor blades 118 can be rotated to change a pitch of the rotor blades 118. Still further, each of the rotor blades 118 comprise a weight system 200 disposed within an interior space of the spar 122 at a spanwise location near the end cap 130. While one of the rotor blades 118 of FIG. 3 is shown with portions cut away for illustration purposes to highlight the internal construction of the rotor blades 118, the spar 122, the composite core 124, and the outer skin 126 are generally continuous along a spanwise direction as shown in the uppermost located rotor blade 118 of FIG. 3. The proprotor 116 is substantially symmetric to the proprotor 114; therefore, for sake of efficiency certain features will be disclosed only with regard to proprotor 114. However, one of ordinary skill in the art would fully appreciate an understanding of proprotor 116 based upon the disclosure herein of proprotor 114.

Further, proprotors 114, 116 are illustrated in the context of tiltrotor aircraft 100; however, proprotors 114, 116 can be implemented on other tiltrotor aircraft. For example, an alternative embodiment may include a quad tiltrotor that has an additional wing member aft of wing 108, the additional wing member can have additional proprotor systems similar to proprotors 114, 116. In another embodiment, proprotors 114, 116 can be used with an unmanned version of tiltrotor aircraft 100. Further, proprotors 114, 116 can be integrated into a variety of tiltrotor aircraft configurations. The tiltrotor aircraft 100 further comprises weight systems 200 described in greater detail below.

Figure 4:
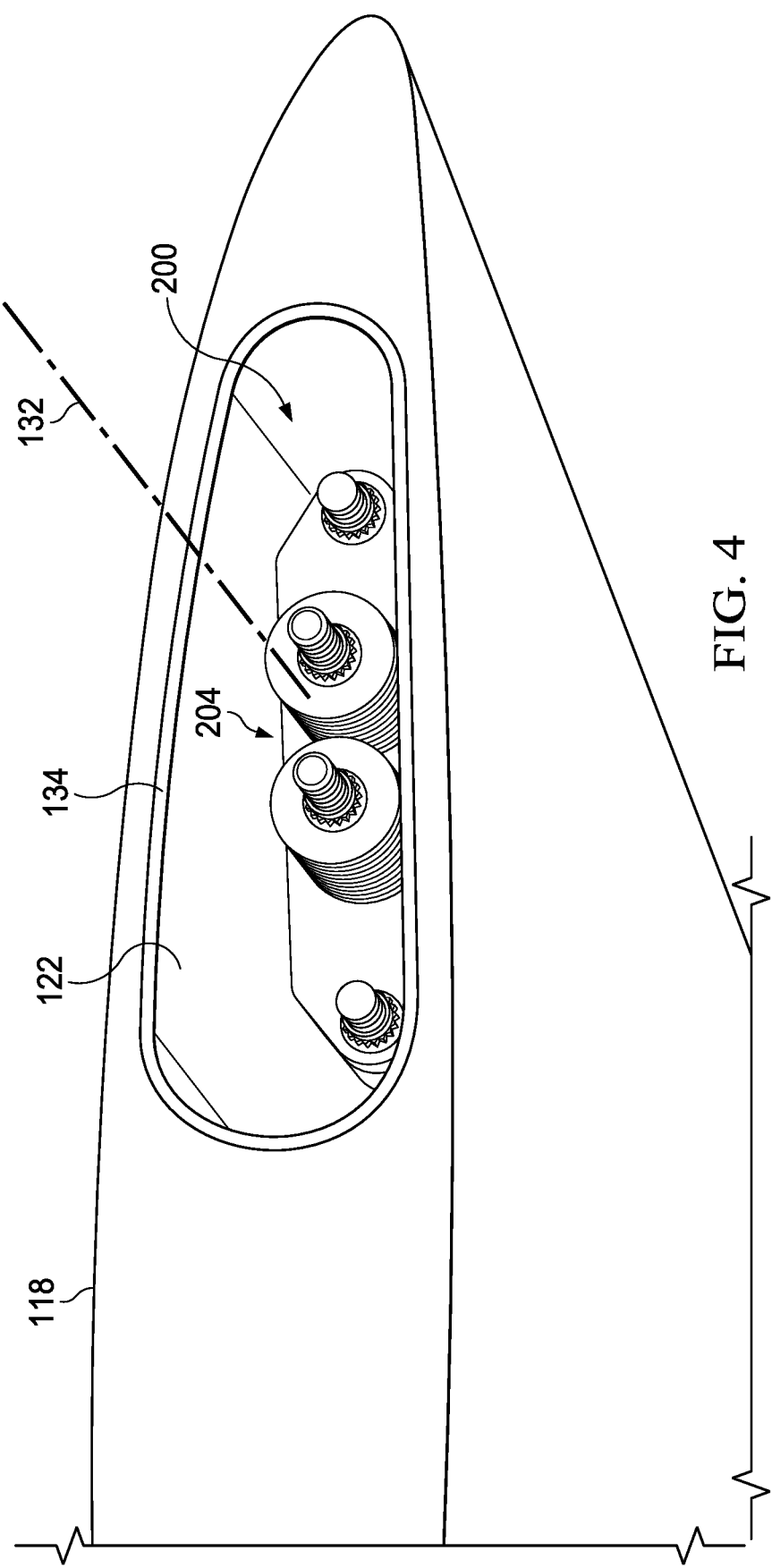
FIG. 4 is a partial oblique view of a rotor blade of the aircraft of FIG. 1, the rotor blade comprising a weight system according to an embodiment of this disclosure.
Figure 5:
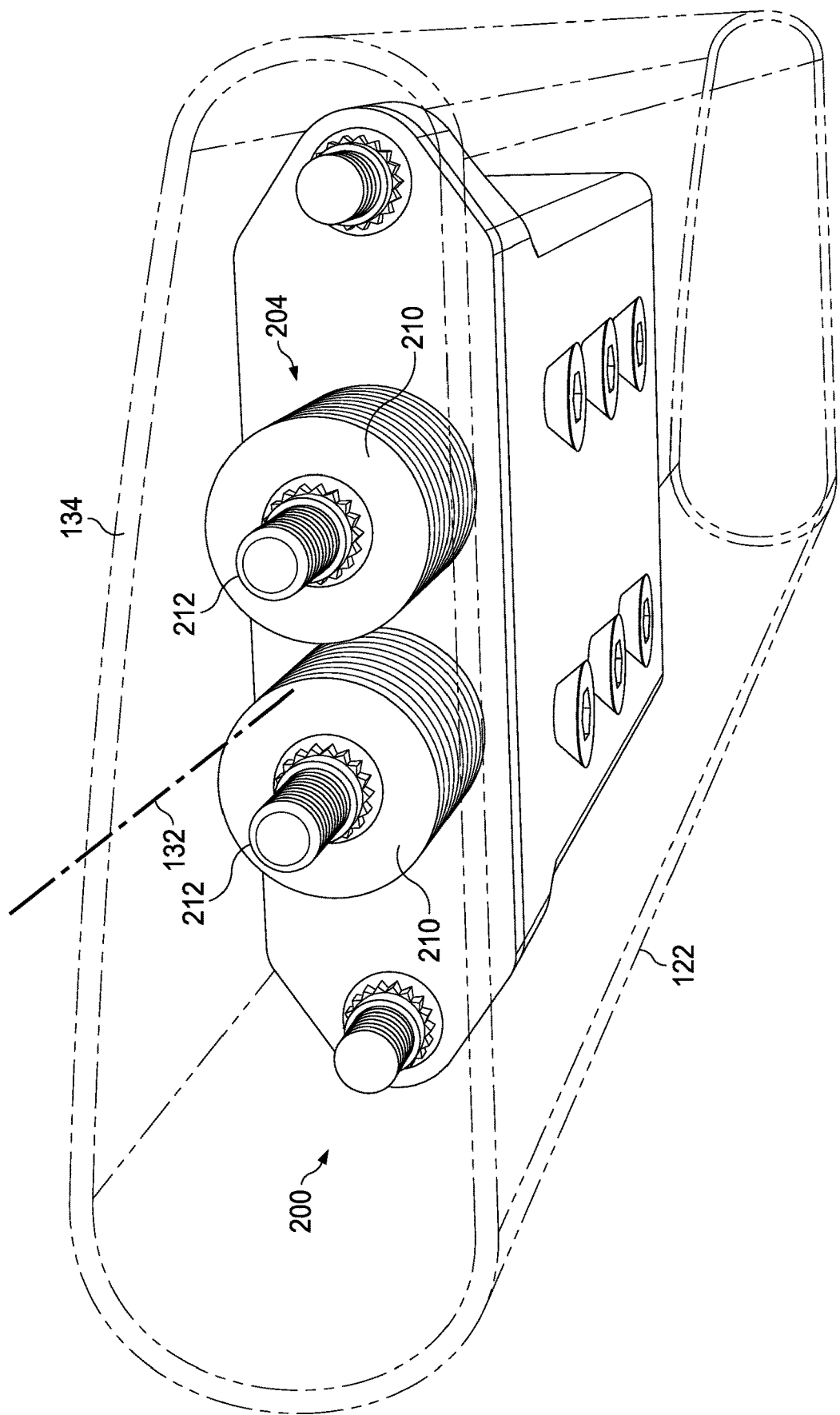
FIG. 5 is an oblique view of the weight system of FIG. 4 disposed within a spar of the rotor blade of FIG. 4.
Figure 6:
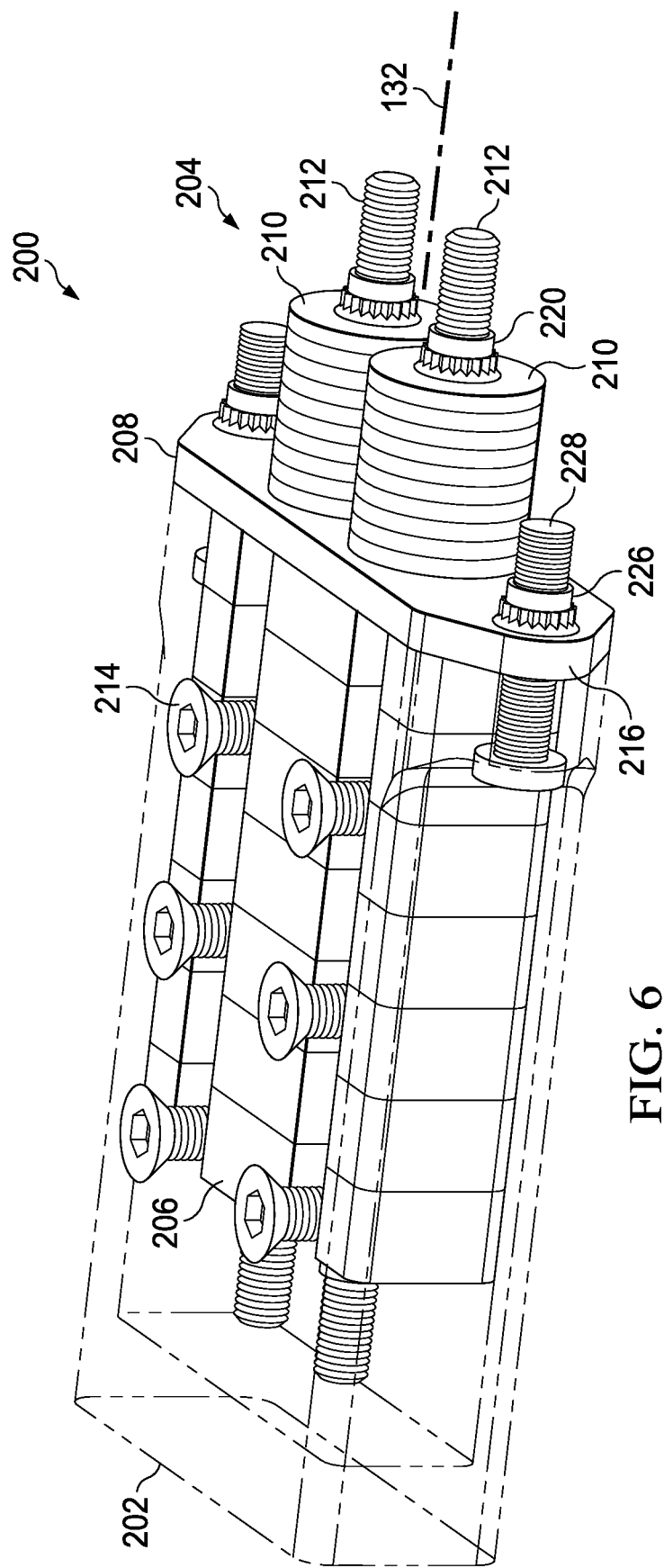
FIG. 6 is an oblique view of the weight system of FIG. 4.
Figure 7:
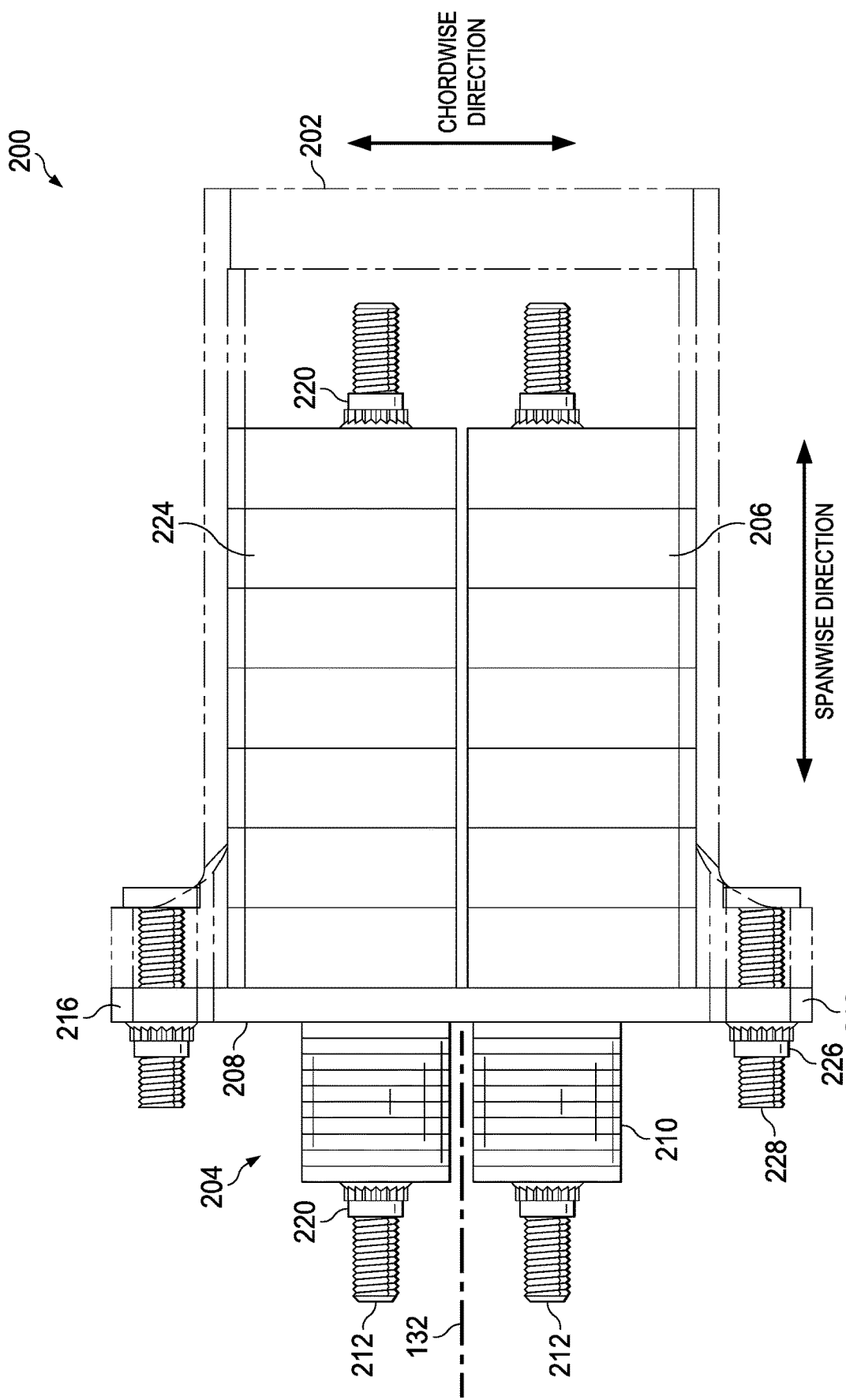
FIG. 7 is an orthogonal view of the weight system of FIG. 4.
Figure 8:
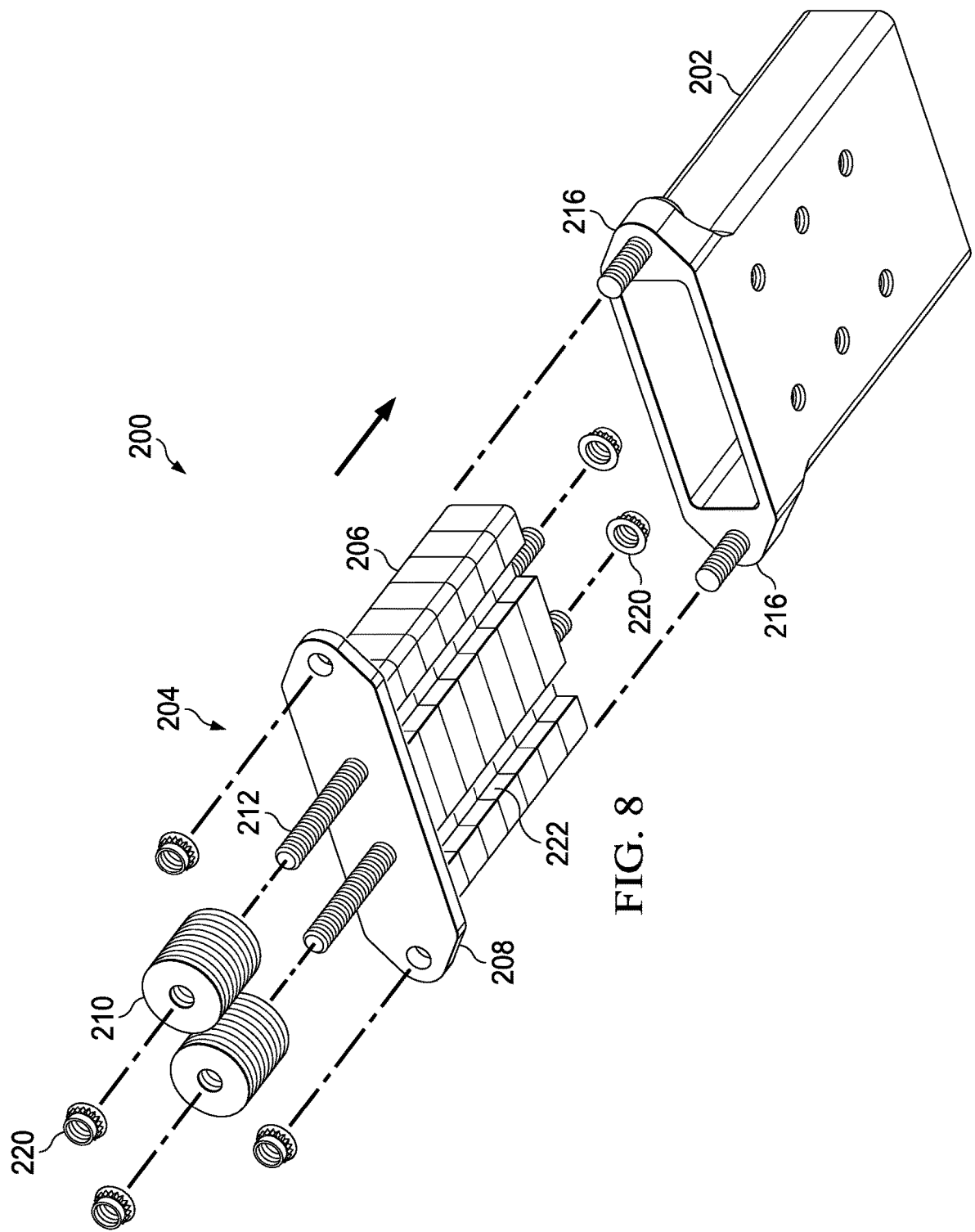
FIG. 8 is an oblique exploded view of the weight system of FIG. 4.
Figure 9:
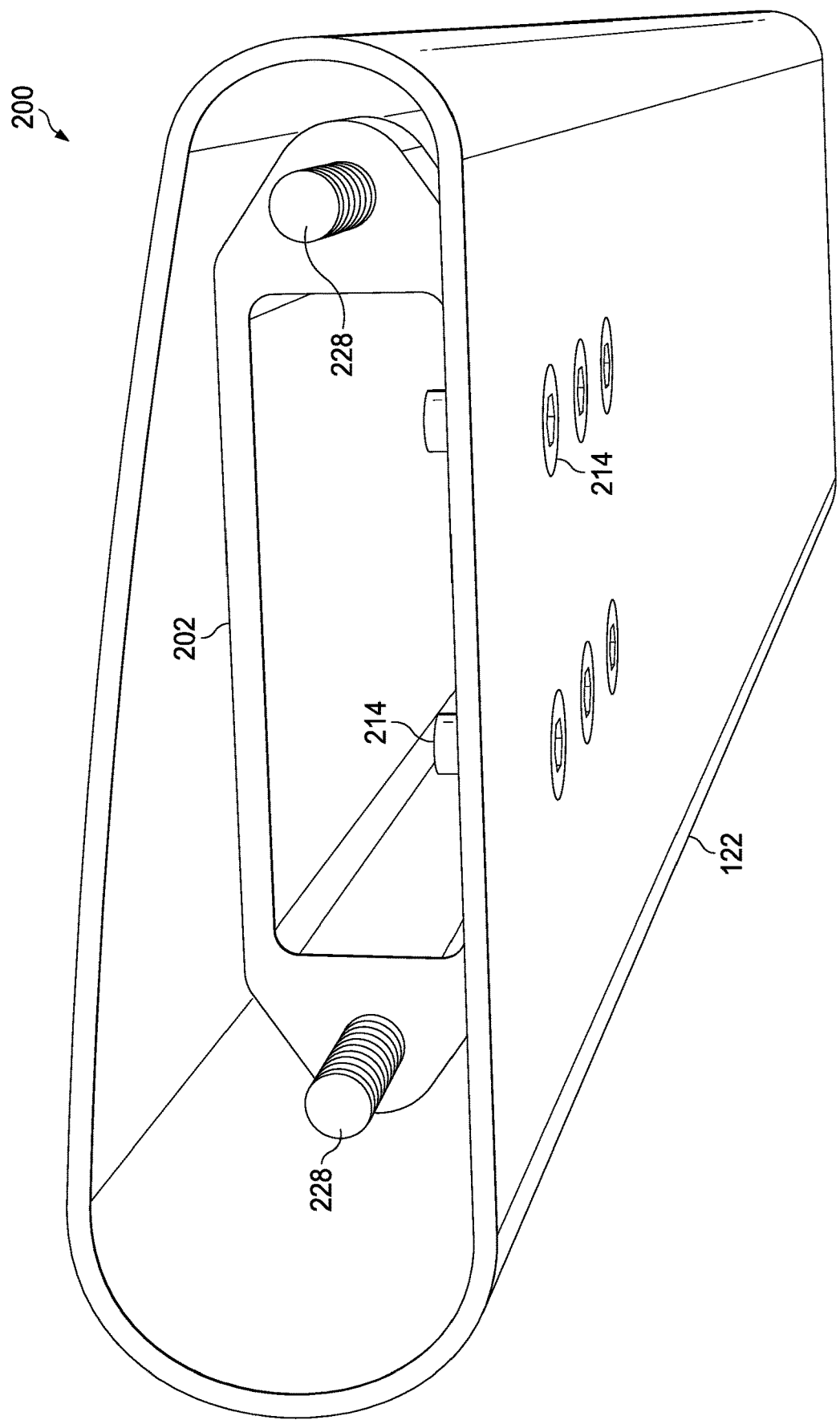
FIG. 9 is a partial oblique view of the weight system of FIG. 4.

Referring now to FIG. 4, a weight system 200 is shown disposed within a spar 122 of a rotor blade 118 and with the end cap 130 removed. In this embodiment, the weight system 200 is located near a tip end 134 of the spar 122. In this embodiment, the weight system 200 is attached to the spar 122 by both adhesive bonding and through use of fasteners, but connecting the weight system 200 to the spar 122 also provides a smooth, undisturbed, aerodynamic blade surface that prevents premature blade surface erosion.

Referring more generally to FIGS. 4-9, the weight system 200 generally comprises a weight box 202, that is installed through the tip end 134 of the spar 122 prior to rotor blade 118 assembly. In this embodiment the weight box 202 is bonded and fastened to the lower inner spar surface and subsequently covered over with rotor blade 118 components to result in a trapping condition of the weight box 202 that prevents the weight box 202 from separating from the rotor blade 118. After the rotor blade 118 is cured and machined to final shape, a weight package 204 can be inserted into the weight box 202 and fastened in place. The weight package 204 comprises larger span balance weights 206, a weight box cover 208, smaller dynamic balance weights 210, and threaded weight guide rods 212. The weight system 200 can be adjusted to balance the full set of rotor blades 118 to each other. Adjustment of the weight system 200 can be accomplished by accessing the weight system 200 through the tip end 134 of the spar 122 and/or rotor blade 118. The dynamic balance weights 210 are decoupled from the span balance weights 206 so that fine tuning of the rotor blade 118 does not require that the entire weight package 204 be removed. In this embodiment, the two weight guide rods 212 are configured to straddle the pitch change axis 132 and/or center of twist of the rotor blade 118. Accordingly, the weight system 200 allows location of weights forward or aft of the pitch change axis 132 to adjust the rotor blade 118 chord balance. Further, because the weight system 200 does not disturb the outermost layers and/or features of the rotor blade 118, a higher reliability of bondline inspection can be achieved before the rotor blade 118 is fully assembled.

In assembly, heads of fasteners 214 are configured to be flush with the spar 122 outer surface. After the weight box 202 is attached to the inside of the spar 122, the rotor blade 118 components are assembled to the spar 122 so that no outer spar surface remains exposed. Next, the fasteners 214 are covered by blade components such as an outer skin so that the weight system 200 is trapped within the rotor blade 118. Further, the weight system 200 does not interfere with any electrical heating elements that may be utilized in the rotor blade 118 for icing protection. In this embodiment, the weight box 202 is substantially rectangular and closed on all sides except for the outboard end. The weight box 202 comprises flanges 216 on the forward and aft sides of the outboard end. The flanges 216 provide support for the heads of anti-rotation bolts 228 that are used to attached the weight package 204 to the weight box 202. Prior to installing the weight box 202 to the spar 122, the bolts 228 are connected to the weight box 202 using an interference fit to prevent rotation of the bolts 228 relative to the weight box 202. In alternative embodiments, rather than utilizing the above-described interference fit to retain bolts 228, the weight box 202 may comprise other anti-rotation features configured to receive and retain bolts 228 so that the bolts 228 do not rotate relative to the weight box 202.

The weight package 204 can be assembled using the two weight guide rods 212 and connecting the weight guide rods 212 to the weight box cover 208 using anti-rotation features that prevent rotation of the weight guide rods 212 relative to the weight box cover 208. The two weight guide rods 212 provide exposed rods on both the inboard and outboard sides of the weight box cover 208. The weight guide rods 212 can be fully threaded (such as all thread rods) or mostly smooth bolt shanks on either side of the weight box cover 208 but with threaded ends to allow nuts 220 to tighten span balance weights 206 and dynamic balance weights 210 into place. Next, the desired number of span balance weights 206 can be guided onto the weight guide rods 212 from the inboard end of the weight guide rods 212 and be caused to stack flush against the weight box cover 208. The nuts 220 can be applied to the inboard end of the weight guide rods 212 to sandwich the span balance weights 206 between the nuts 220 and the weight box cover 208. In the case that bolt shank rods are used to form the weight guide rods 212, lightweight spacers can be placed along the rods to occupy shank space and allow the nuts 220 to tighten the span balance weights 206 relative to the weight box cover 208.

In cases where chordwise balancing is desired or needed, individual span balance weights 206 and/or dynamic balance weights 210 can be added to either the forward or aft located weight guide rods 212 in order to bias the total weight fore or aft of the pitch change axis 132. In cases where bolt shank rods are used to form the weight guide rods 212, a side that is not fully occupied with weights may need to be filled with lightweight spacers such as spacers 224 to fill the space and occupy the distance along the threaded portion of the weight guide rods 212 so that the nuts 220 can be used to tighten the span balance weights 206 and dynamic balance weights 210 into place. In this embodiment, the span balance weights 206 comprise notches 222 configured to allow fasteners 214 to reside therein and allow spanwise movement of the span balance weights 206 relative to fasteners 214. The spacers 224 can also prevent and/or reduce beamwise movement or bending of the weight guide rods 212.

Next, the dynamic balance weights 210 can be guided onto the outboard extending portion of the weight guide rods 212 and sandwiched between nuts 220 and the weight box cover 208. Both the span balance weights 206 and the dynamic balance weights 210 can comprise a variety of materials and spanwise thicknesses to allow for fine tuning and adjustment of the balancing of the rotor blade 118. Once the nuts 220 are tightened on both ends of both weight guide rods 212, the weight package 204 can be inserted into the weight box 202 via the tip end of the spar 122 and/or the tip end of the rotor blade 118. Next, nuts 226 can be applied to the bolts 228 extending from the flanges 216 and through the weight box cover 208 to secure the weight package 204 relative to the weight box 202 and to fully react the centrifugal force.

Referring now to FIGS. 10-15, an alternative embodiment of a weight system 300 is shown. The weight system 300 is substantially similar to weight system 200 at least insofar as it can provide similar weight balancing without disturbing outer surfaces of a rotor blade 118. The weight system 300 is further similar to weight system 200 in that it comprises a weight box 302, weight package 304, span balance weights 306, a weight box cover 308, dynamic balance weights 310, weight guide rods 312, and nuts 320. The weight system 300 is also attached to an inside of a spar 122 by both bonding and fasteners. However, the weight system 300 is configured for uses where there is not sufficient access to the fore and aft sides of the weight box 302 to allow easy installation and removal of the weight system 300 in the manner provided by weight system 200.

Figure 10:
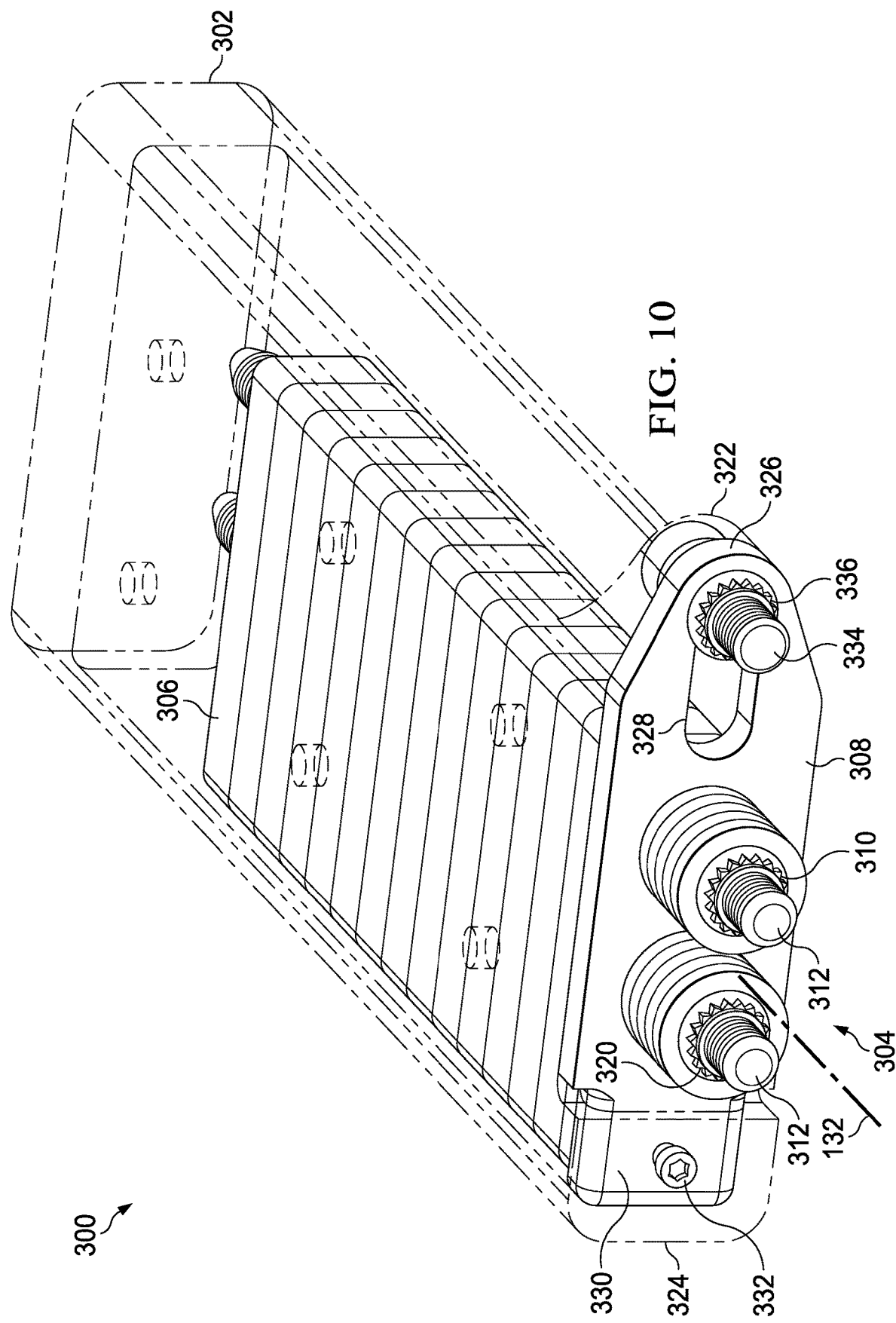
FIG. 10 is an oblique view of a weight system according to another embodiment of this disclosure.
Figure 11:
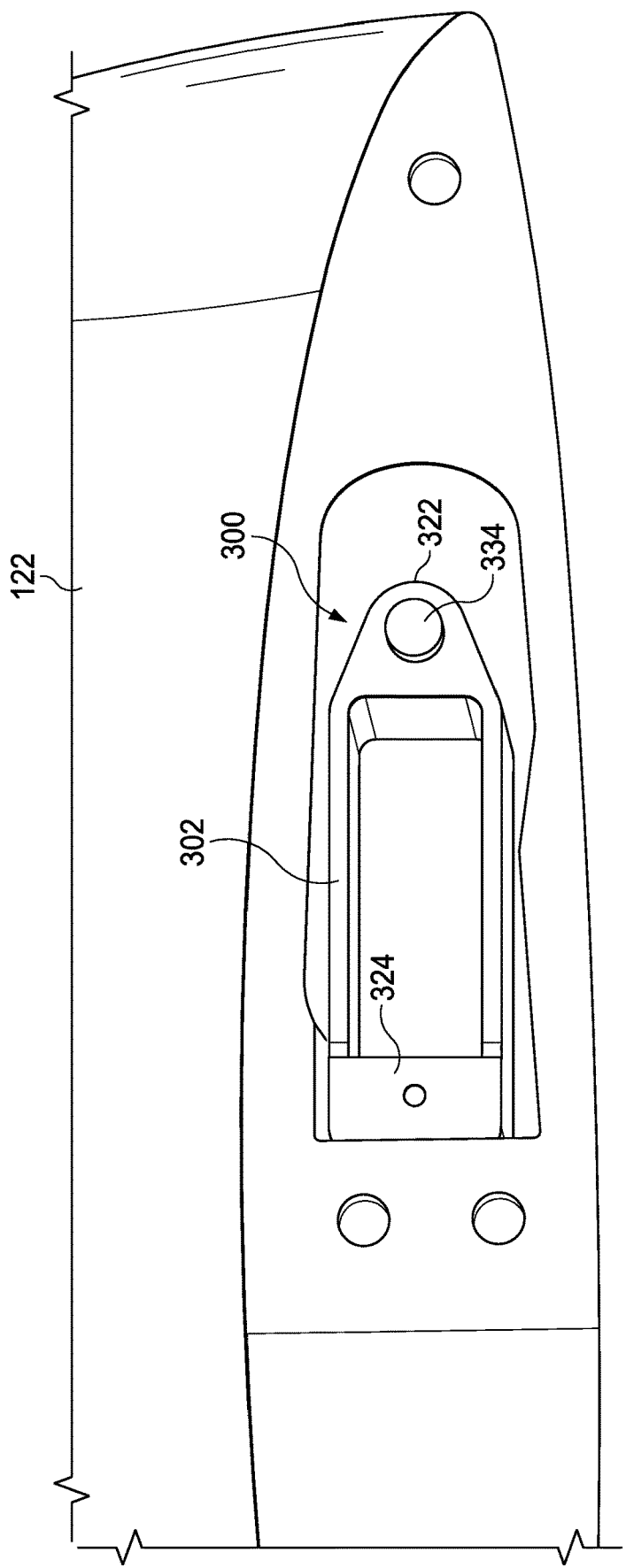
FIG. 11 is a partial oblique view of the weight system of FIG. 10 disposed in a spar of a rotor blade.
Figure 12:
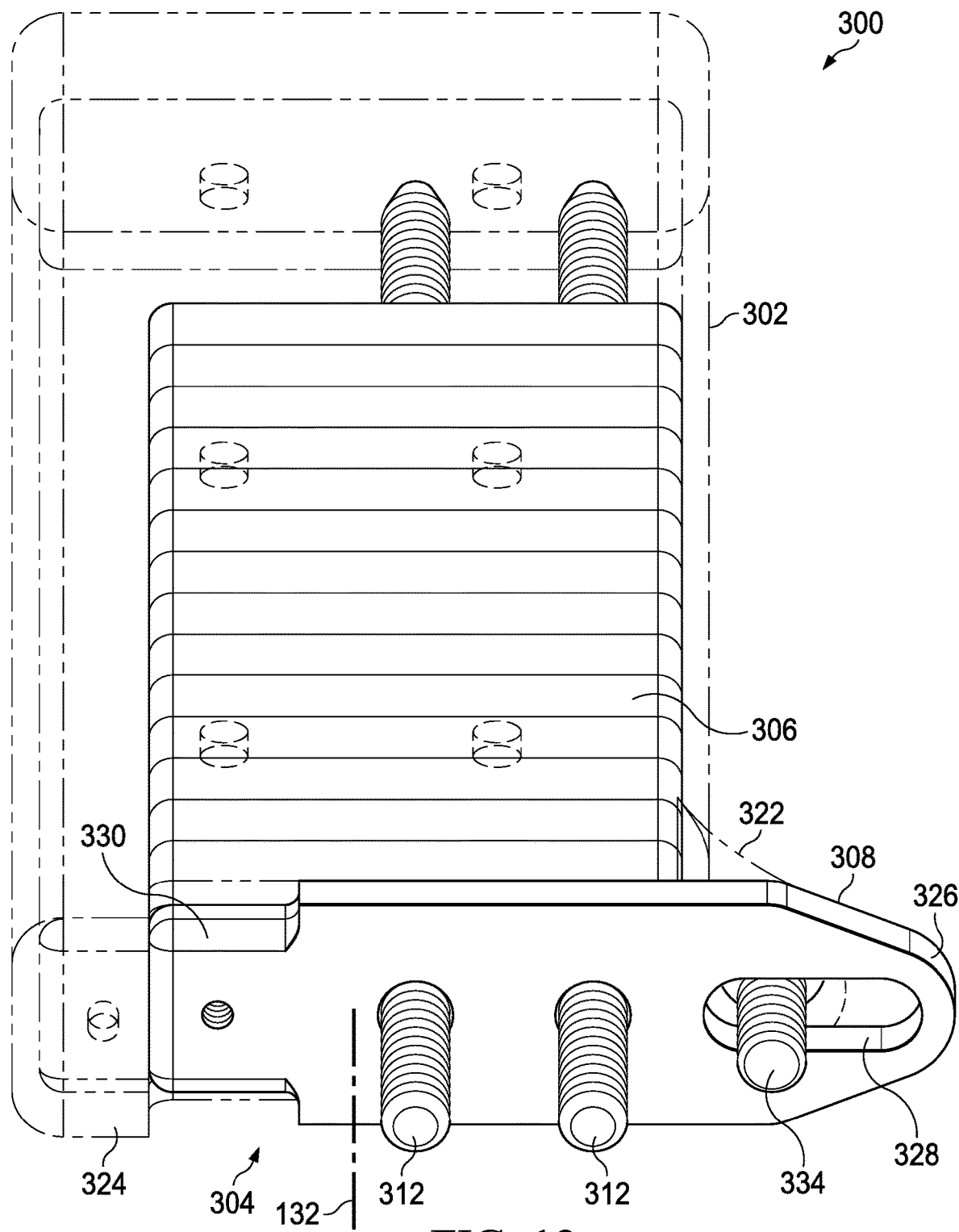
FIG. 12 is an oblique view of the weight system of FIG. 10.
Figure 13:
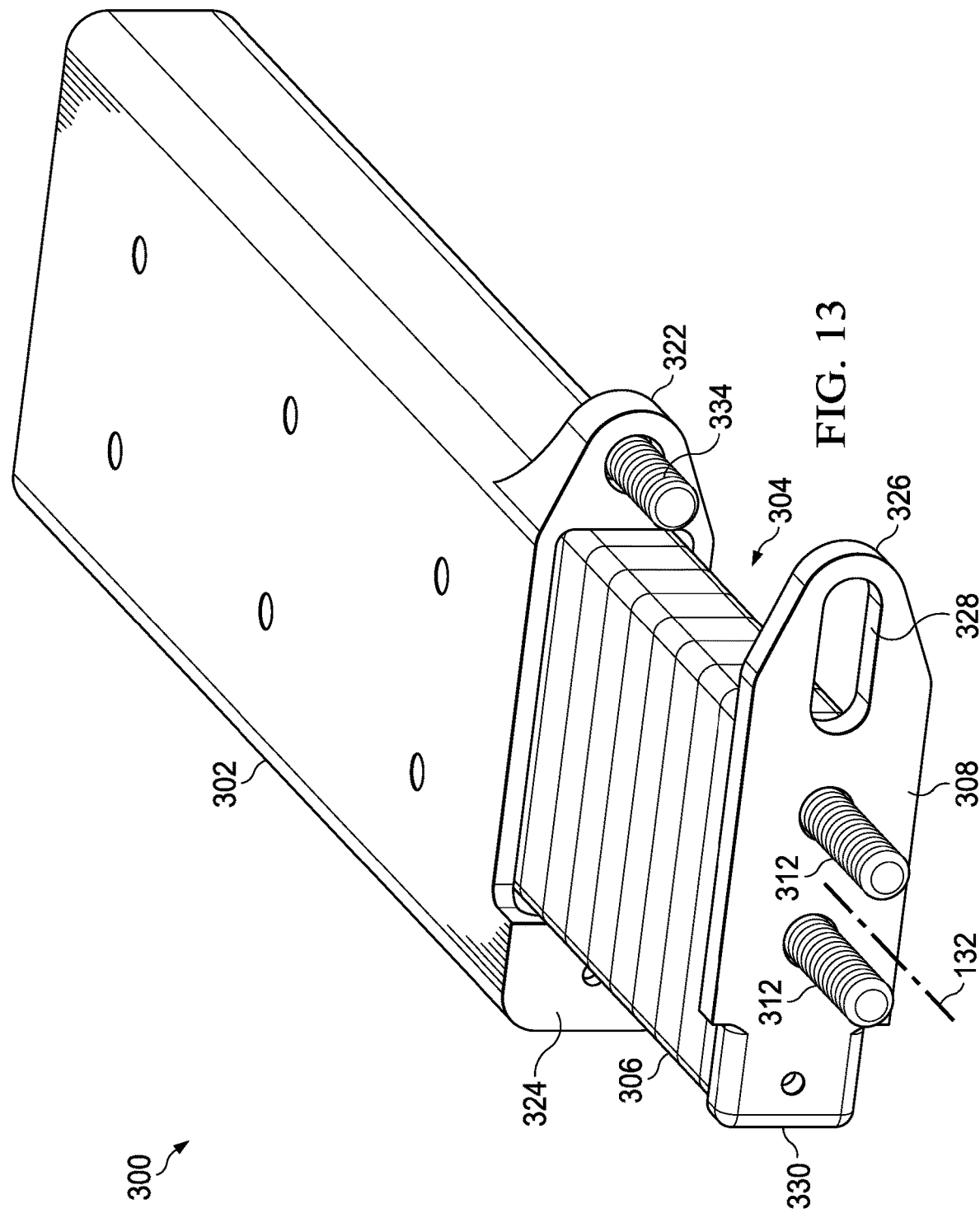
FIG. 13 is an oblique partially disassembled view of the weight system of FIG. 10.
Figure 14:
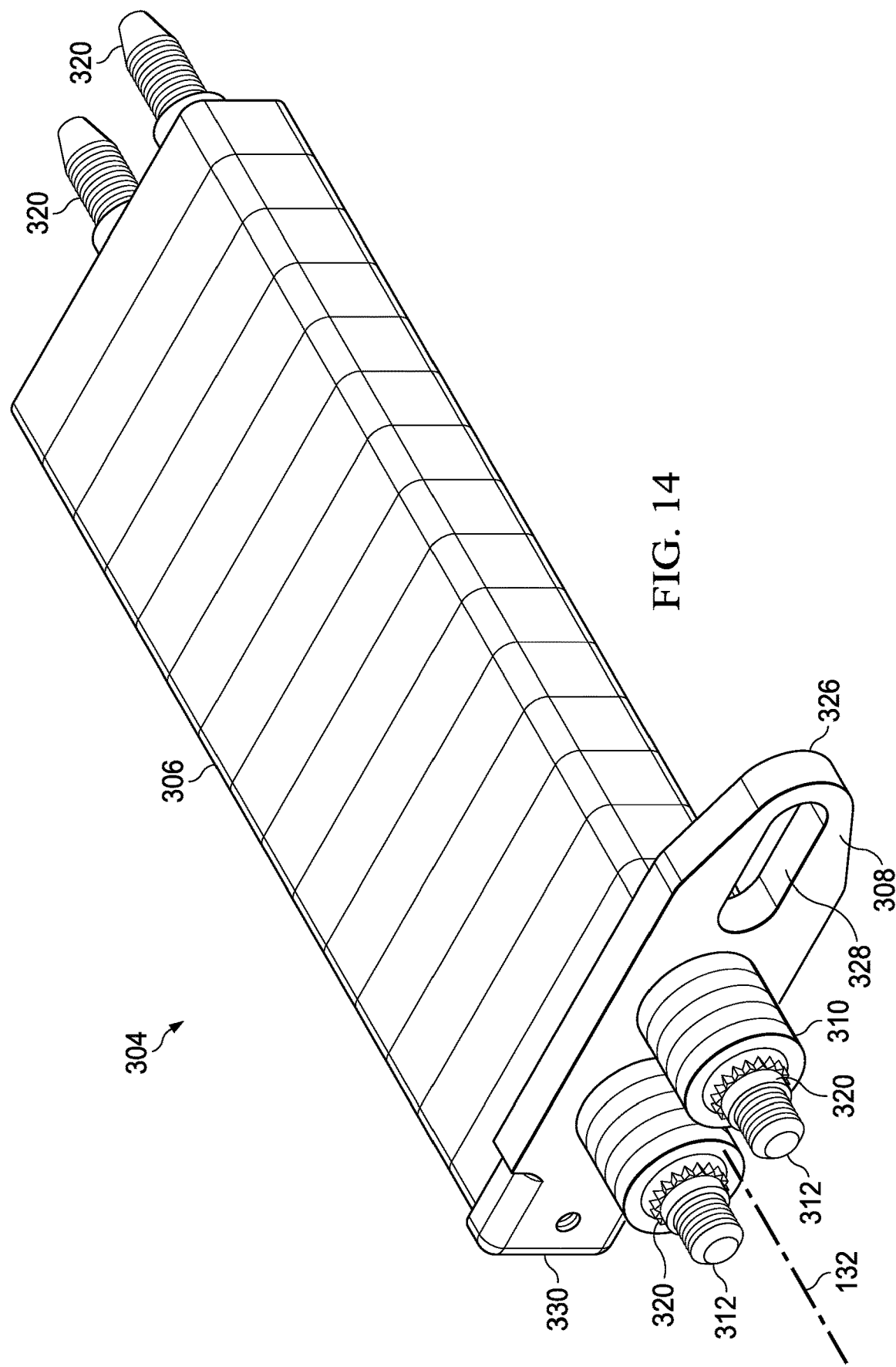
FIG. 14 is an oblique view of a portion of the weight system of FIG. 10.
Figure 15:
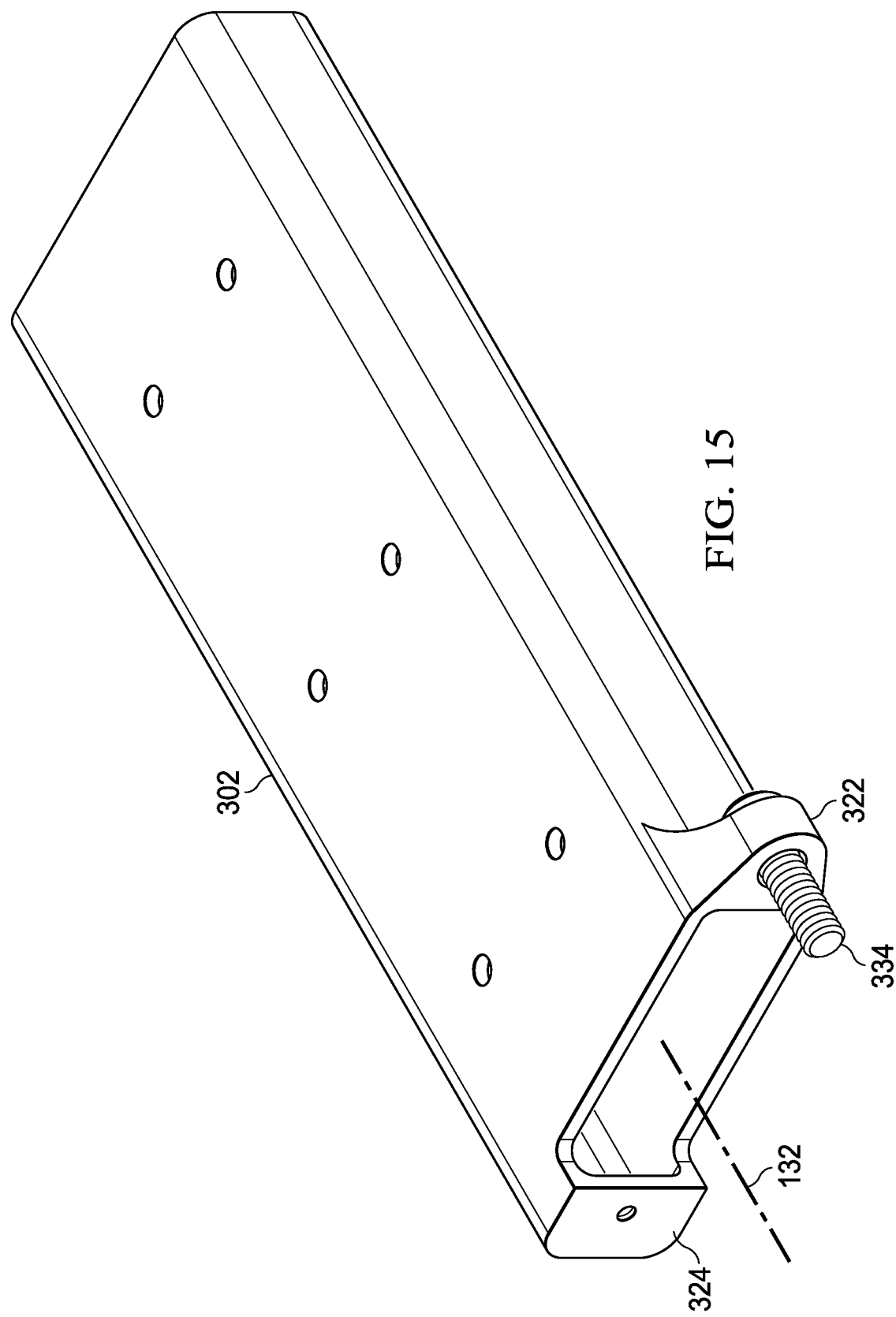
FIG. 15 is an oblique view of another portion of the weight system of FIG. 10.
Figure 16:
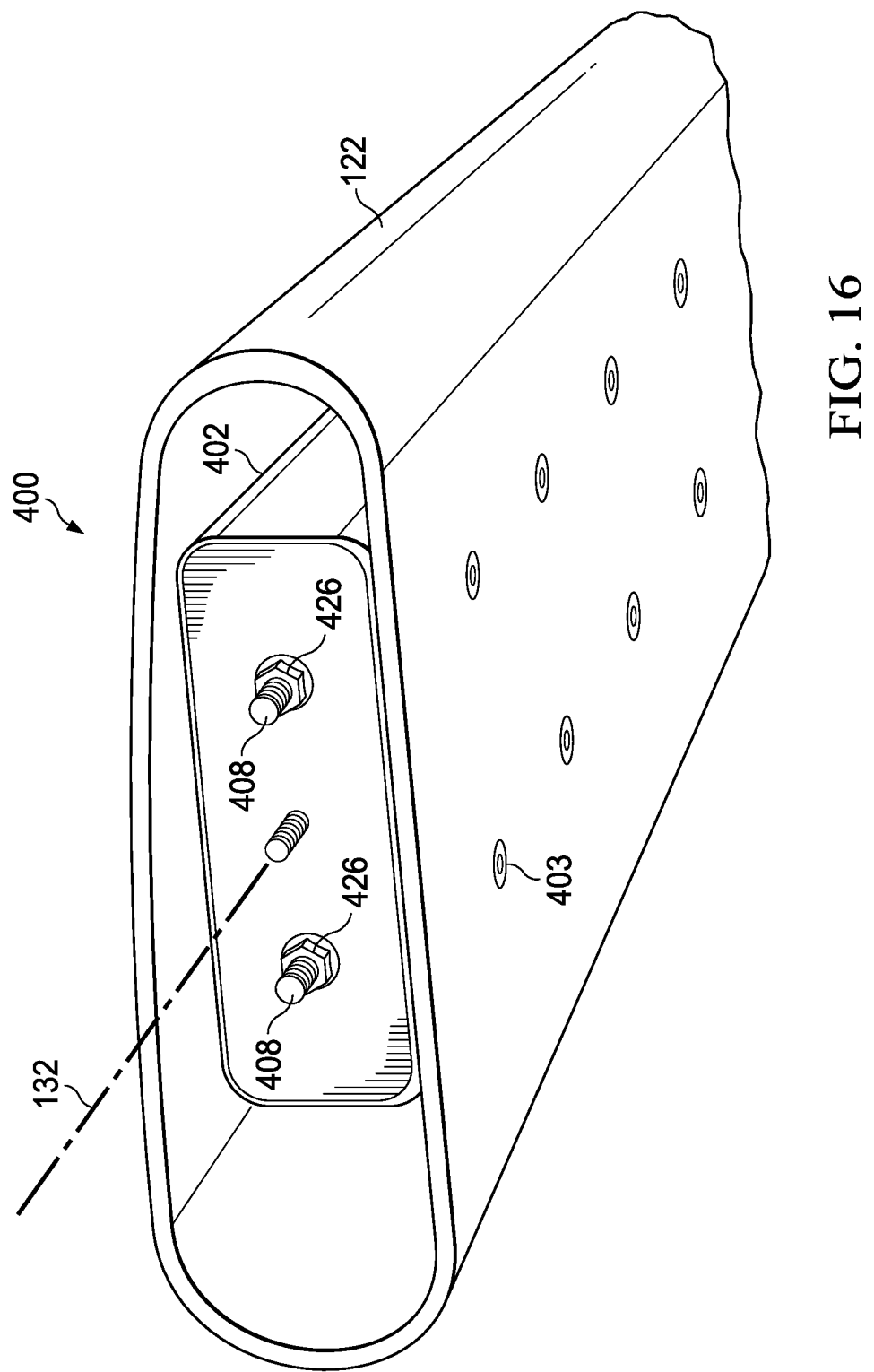
FIG. 16 is an oblique view of a weight system according to another embodiment of this disclosure disposed in a spar of a rotor blade.
Figure 17:
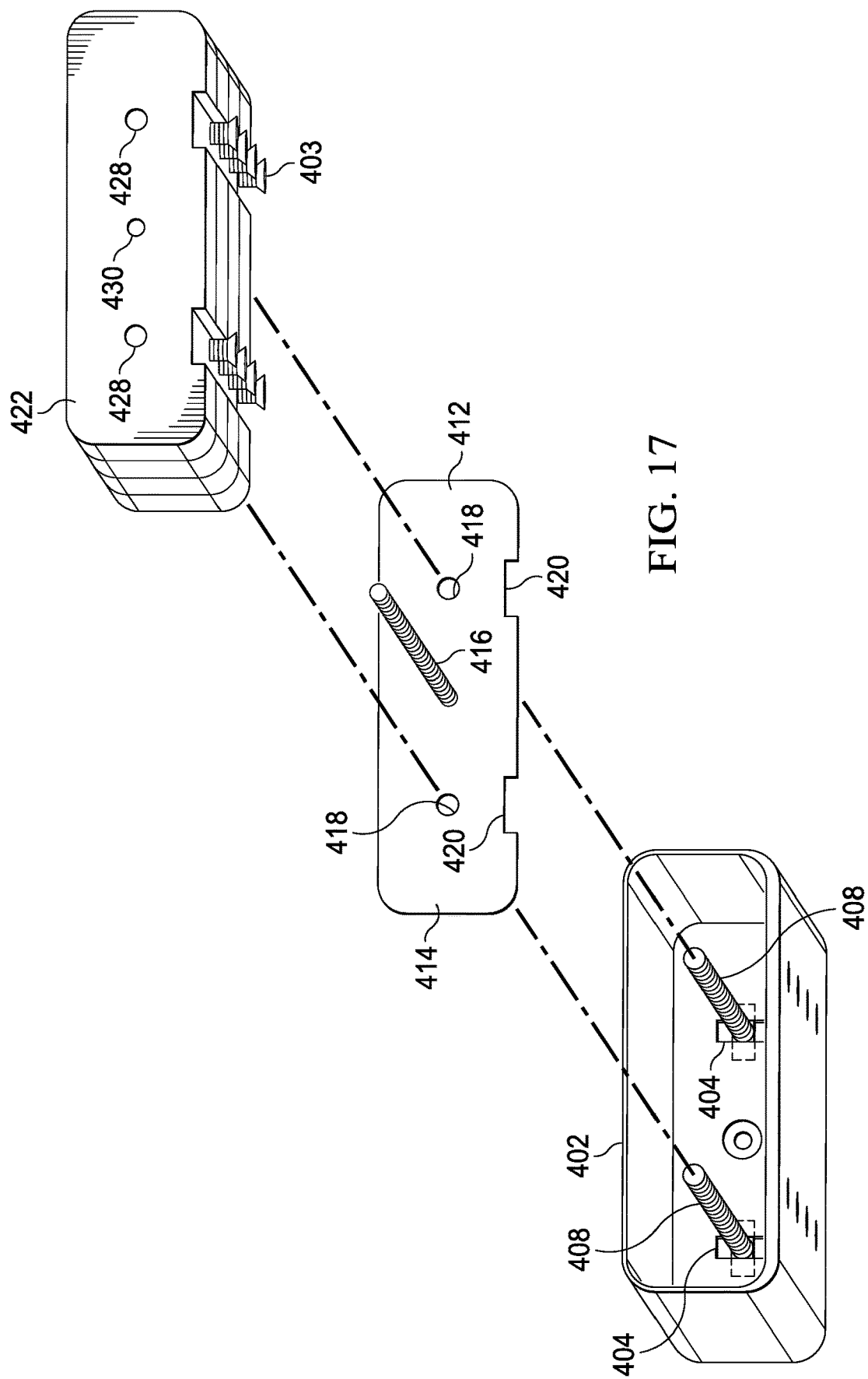
FIG. 17 is an oblique exploded view of the weight system of FIG. 16.
Figure 18:
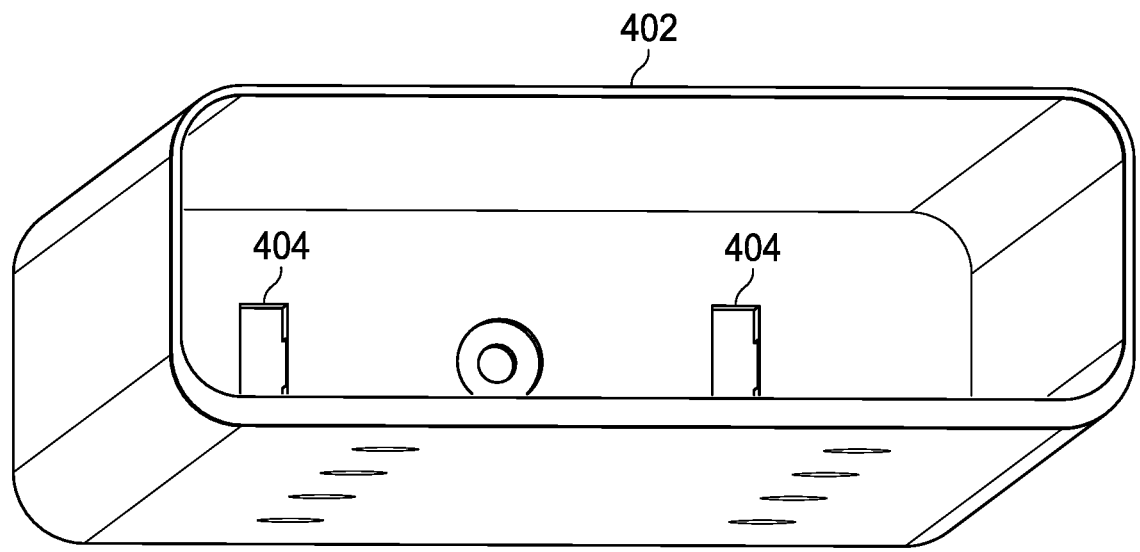
FIG. 18 is an oblique view of a portion of the weight system of FIG. 16.
Figure 19:
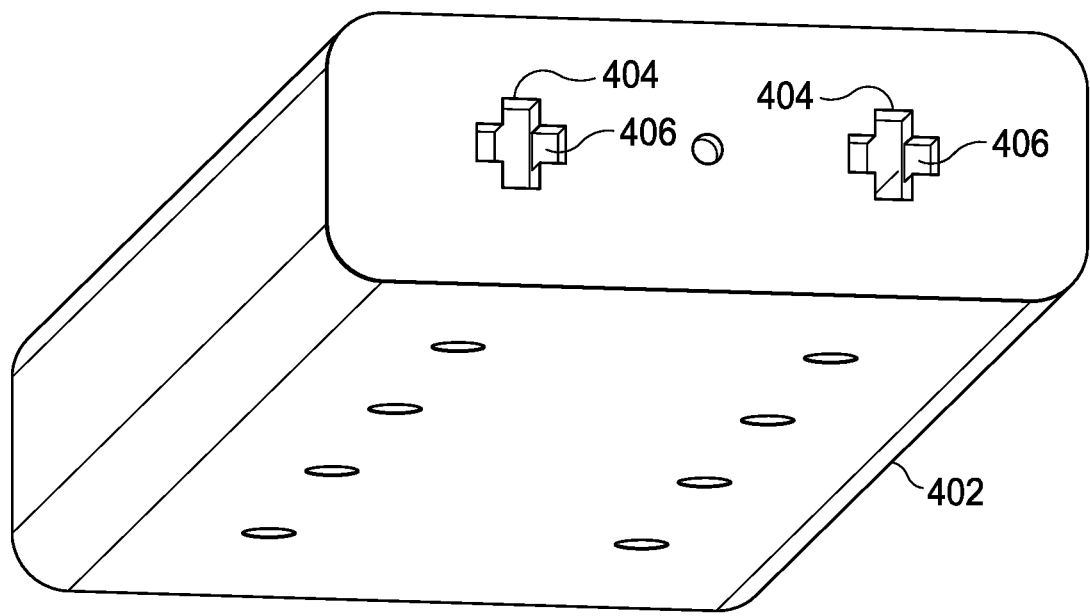
FIG. 19 is another oblique view of a portion of the weight system of FIG. 16.

Instead, the weight box 302 comprises a single flange 322 and a catch 324 at the outboard end of the weight box 302. The weight box cover 308 comprises an extension 326 comprising a slot 328 and a tongue 330. FIG. 10 shows the weight system 300 fully assembled with a fastener 332 extending through the catch 324 and into the tongue 330. With the tongue 330 captured within the catch 324, a bolt 334 extends from the extension 326 and through the slot 328 and a nut 336 secures the weight box cover 308 relative to the weight box 302. To remove the weight package 304 from the weight box 302, the nut 336 and the fastener 332 are removed first. Next, the weight package 304 is moved laterally relative to the weight box 302 until the bolt 334 is located at an opposing end of the slot 328, a position in which the tongue 330 is no longer bounded by the catch 324 in a spanwise direction. Next, the weight package 304 can be slid out of the weight box 302.

Figure 20:
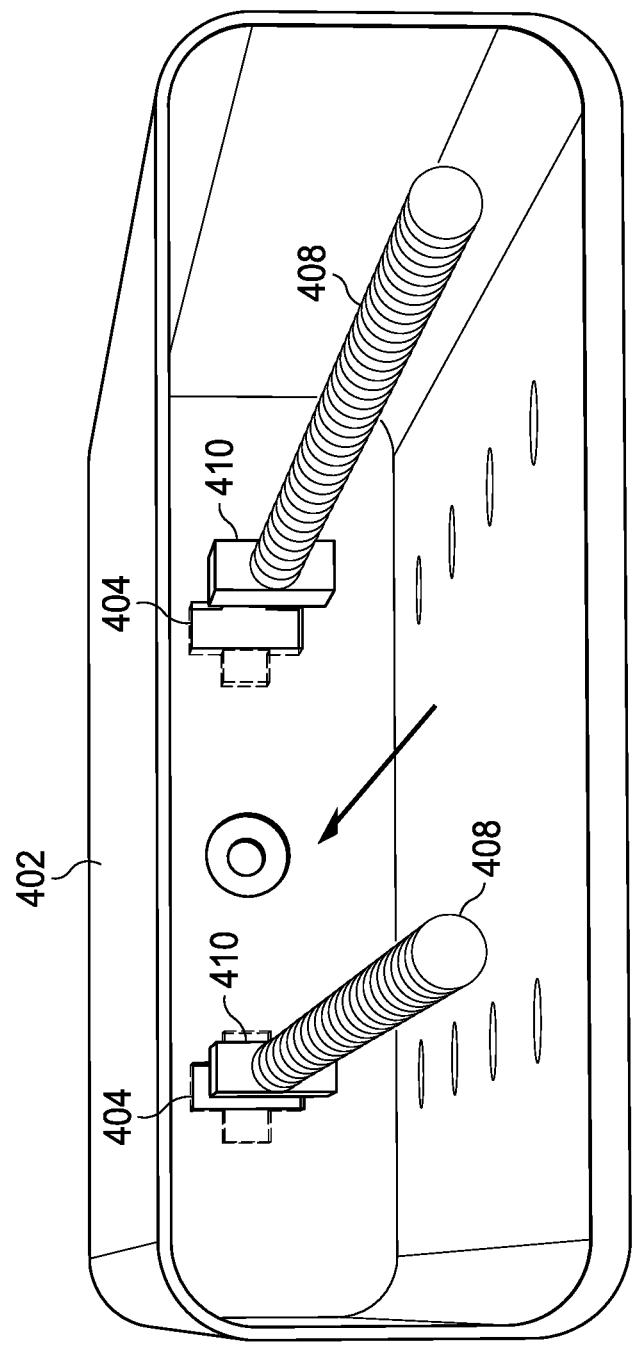
FIG. 20 is an oblique view of a portion of the weight system of FIG. 16 illustrating a step of assembling the weight system of FIG. 16.
Figure 21:
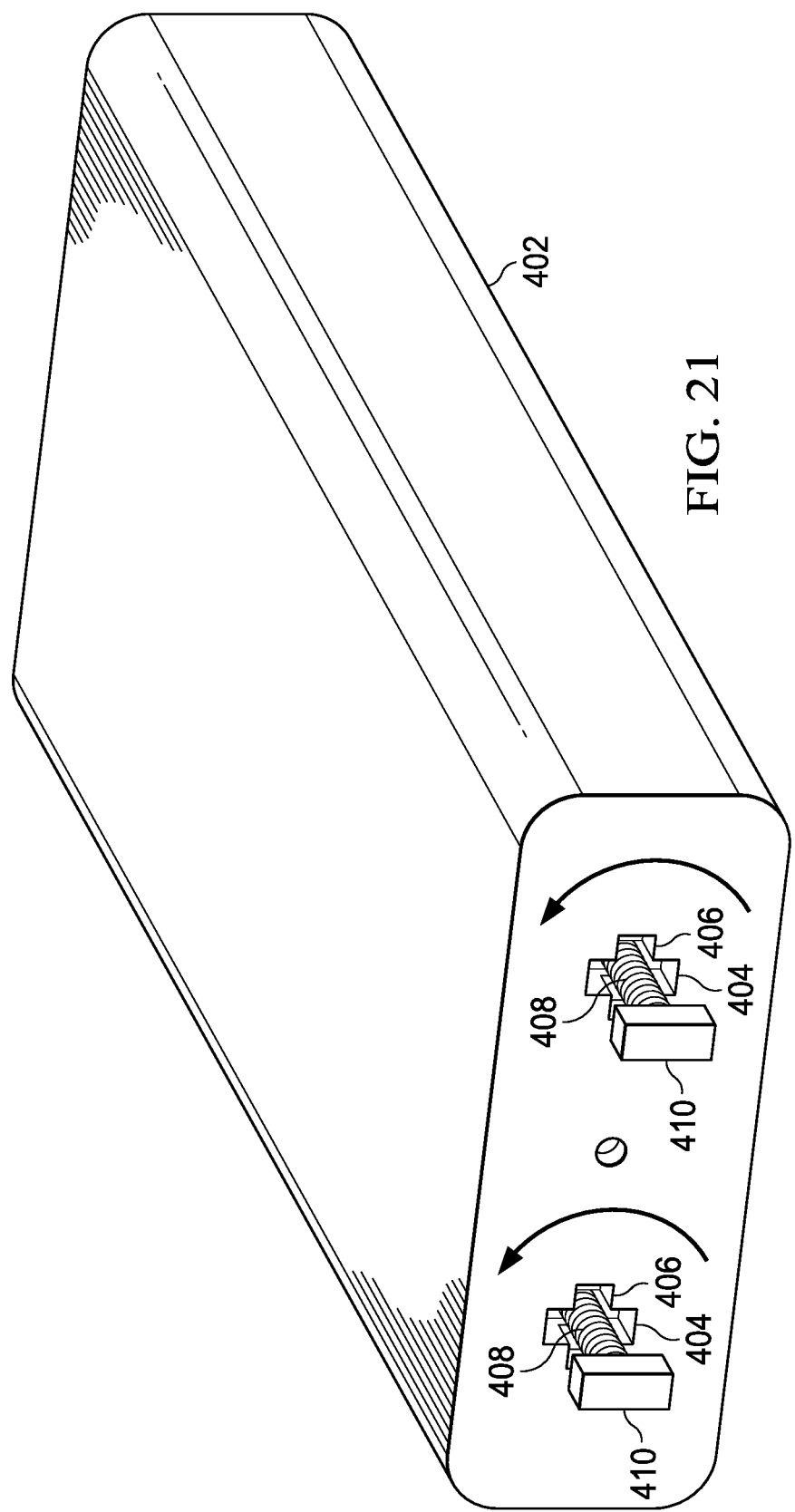
FIG. 21 is an oblique view of a portion of the weight system of FIG. 16 illustrating another step of assembling the weight system of FIG. 16.

Referring now to FIGS. 16-23, an alternative embodiment of a weight system 400 is shown. The weight system 400 is substantially similar to weight systems 200, 300 insofar as it can provide similar weight balancing without disturbing outer surfaces of a rotor blade 118. The weight system 400 comprises a weight box 402 that can be bonded and fastened to an interior of a spar 122. In this embodiment, the weight box 402 does not have flanges at the outboard end as is the case with the weight boxes 202, 302. Instead, the weight box 402 comprises key slots 404 through an inboard wall and lock depressions 406 formed on the outer side of the inboard wall. The weight system 400 further comprises weight guide rods 408 comprising rectangular keys 410 on the inboard ends of the weight guide rods 408. The weight system 400 can be assembled by first bonding and fastening the weight box 402 to the spar 122 using fasteners 403. Next the weight guide rods 408 can be oriented to align the rectangular keys 410 with the key slots 404 as shown in FIG. 20. Next, the weight guide rods 408 can be moved inboard so that the rectangular keys 410 can be extended fully beyond the inboard wall of the weight box 402 as shown in FIG. 21.

Figure 22:
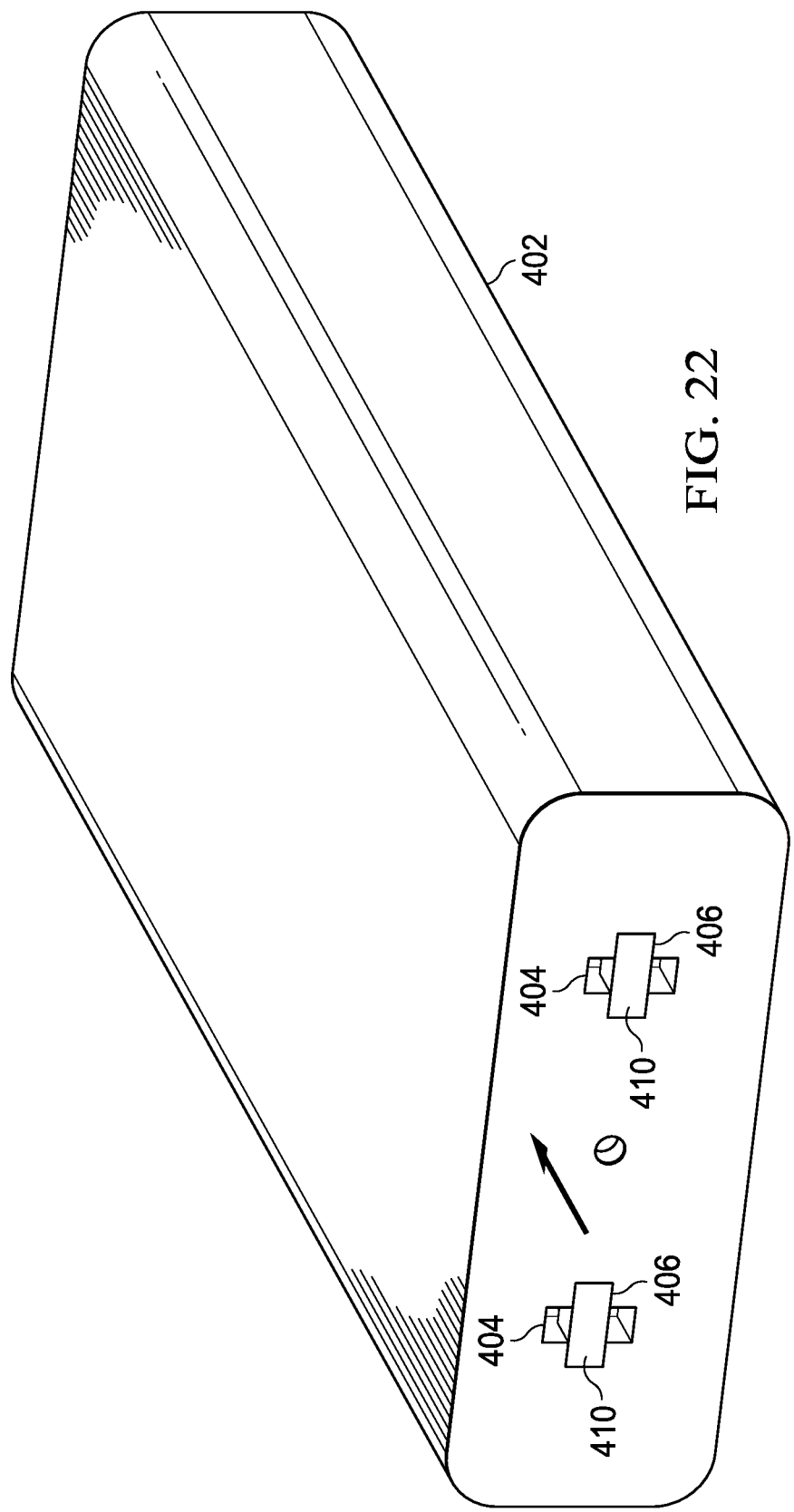
FIG. 22 is an oblique view of a portion of the weight system of FIG. 16 illustrating another step of assembling the weight system of FIG. 16.
Figure 23:
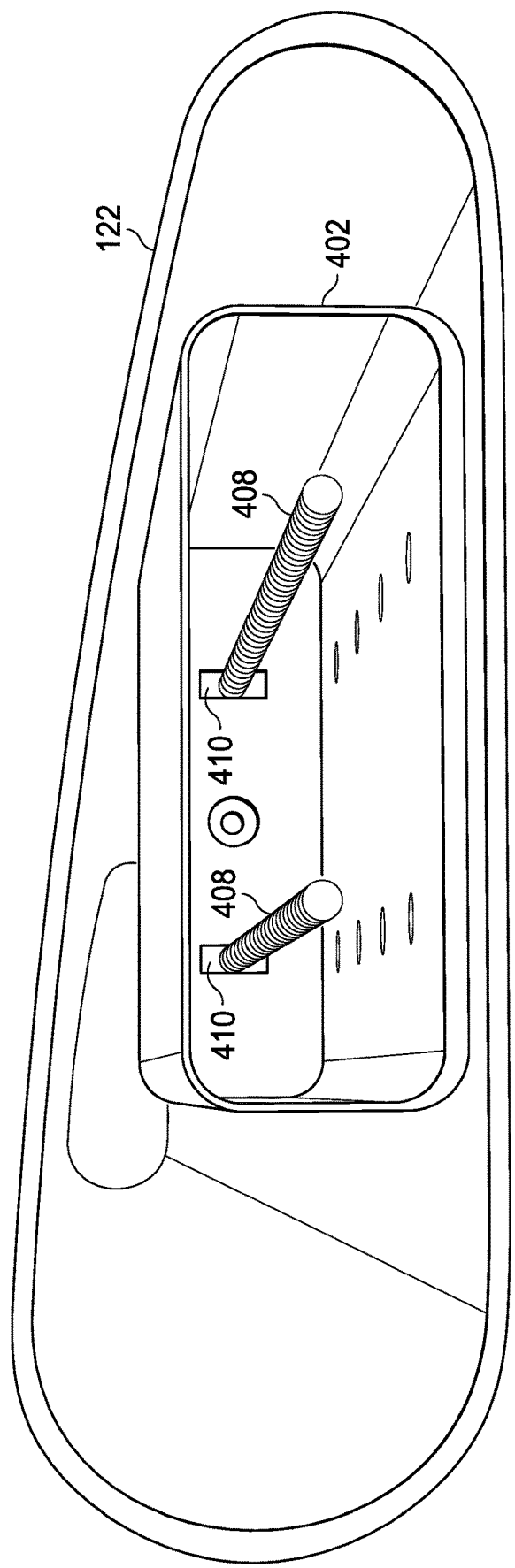
FIG. 23 is another oblique view of a portion of the weight system of FIG. 16.

Next, the weight guide rods 408 can be rotated, in this case ninety degrees, to align the rectangular keys 410 with the lock depressions 406. Finally, the weight guide rods 408 can be pulled in an outboard direction to seat the rectangular keys 410 within the lock depressions 406 with an interference fit, thereby locking the weight guide rods 408 into place relative to the weight box 402 as shown in FIGS. 22 and 23. Next, a weight guide base 412 comprising a plate 414, a rod 416, holes 418, and cutouts 420 can be assembled to the weight guide rods 408 by inserting the weight guide rods 408 through the holes 418 and moving the weight guide base 412 toward the inboard wall of the weight box 402. Once the weight guide base 412 is assembled, span balance weights 422 can be similarly aligned with the weight guide rods 408 and slid toward the inboard wall of the weight box 402 so that the weight guide rods 408 pass through holes 428 of the span balance weights 422 and the rod 416 passes through holes 430 of the span balance weights 422.

After a desired number of span balance weights 422 are located on the weight guide rods 408, dynamic balance weights can be added to the weight guide rods 408 and secured using nuts 426. Application of the nuts 426 sandwiches the weight guide base 412, the span balance weights 422, and the dynamic balance weights between the nuts 426 and the inboard wall of the weight box 402. To remove the weights, the nuts 426 are removed from the weight guide rods 408 and the outboard end of the rod 416 is pulled in an outboard direction to slide the weights and the weight guide base 412 away from the inboard wall of the weight box 402.

While the weight systems 200, 300, 400 are primarily described above as being used with a tiltrotor aircraft 100, in alternative embodiments, the weight systems 200, 300, 400 can be utilized in conjunction with rotor blades of any other device. Specifically, the weight systems 200, 300, 400 can be incorporated into rotor blades of any aircraft, including, but not limited to, airplanes, helicopters, and/or dirigibles. Still further, the weight systems 200, 300, 400 can be utilized in conjunction with rotor blades of water craft, hovercraft, wind turbine systems, and/or any other system that utilizes rotor blades that may benefit by comprising a weight balanced rotor blade.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A weight system for a rotor blade, comprising:
   a weight box open in a spanwise direction, the weight box extending both forward and rearward relative to a pitch change axis;
   a weight guide rod connected to the weight box, the weight guide rod extending in the spanwise direction through an interior of the weight box; and
   a span balance weight disposed within the weight box, the span balance weight being captured between the weight guide rod and the weight box;
   wherein the span balance weight is configured for insertion into the weight box and removal from the weight box via the spanwise direction opening of the weight box;
   wherein the weight box is substantially closed on all sides except for the spanwise direction opening; and
   wherein the weight box comprises at least one mounting aperture that extends generally orthogonal relative to the spanwise direction.

2. The weight system of claim 1, wherein the weight box comprises a flange on an outboard end of the weight box.

3. The weight system of claim 2, further comprising:
   a weight box cover configured for attachment to the flange of the weight box and configured to capture the span balance weight within the weight box.

4. The weight system of claim 3, wherein the weight guide rod extends through the weight box cover.

5. The weight system of claim 4, further comprising:
   a dynamic balance weight disposed on a portion of the weight guide rod that extends beyond the weight box cover in the outboard direction.

6. The weight system of claim 5, further comprising a nut configured to interface with an outboard portion of the weight guide rod to capture the dynamic balance weight, the weight box cover, and the span balance weight along the weight guide rod.

7. The weight system of claim 3, wherein the weight guide rod extends through an inboard wall of the weight box.

8. The weight system of claim 7, wherein the inboard wall of the weight box comprises a key slot and wherein an inboard end of the weight guide rod comprises a key configured to selectively fit through the key slot as a function of a relative angular alignment of the key relative to the key slot.

9. The weight system of claim 7, wherein an inboard end of the weight guide rod receives a nut outside the weight box to prevent movement of the weight guide rod in an outboard direction relative to the weight box.

10. The weight system of claim 3, wherein the weight box cover comprises a tongue and a slot.

11. The weight system of claim 10, wherein the weight box comprises a catch configured to receive the tongue in response to a chordwise movement of the weight box cover toward the catch.

* * * * *